United States Patent [19]

Guha

[11] 4,281,894

[45] Aug. 4, 1981

[54] VERY LOW ABSORPTION, LOW EFFICIENCY LASER BEAMSAMPLER

[75] Inventor: Jayanta K. Guha, Canoga Park, Calif.

[73] Assignee: The Perkin-Elmer Corporation, Norwalk, Conn.

[21] Appl. No.: 113,443

[22] Filed: Jan. 21, 1980

[51] Int. Cl.³ ............................ G02B 5/18; G02B 5/08
[52] U.S. Cl. ................................ 350/162 R; 350/166; 350/171
[58] Field of Search ..................... 350/162 R, 1.6, 1.7, 350/164, 166

[56] References Cited

U.S. PATENT DOCUMENTS

| | | | |
|---|---|---|---|
| 3,767,310 | 10/1973 | Dickson | 356/218 |
| 3,861,801 | 1/1975 | Peters et al. | 350/162 R |
| 4,114,978 | 9/1978 | Bostick et al. | 350/162 R |

OTHER PUBLICATIONS

Elson, J. M., "Infrared Light Scattering from Surfaces Coated with Multiple Dielectric Overlayers", Applied Optics, vol. 16, No. 11, pp. 2872-2881, Nov. 1977.

*Primary Examiner*—John K. Corbin
*Assistant Examiner*—Bruce Y. Arnold
*Attorney, Agent, or Firm*—S. A. Giarratana; E. T. Grimes; T. P. Murphy

[57] ABSTRACT

A very low absorption beamsampler for diffracting a very small fraction of a laser beam while specularly reflecting substantially all of the main beam with minimal absorption. The beamsampler comprises a plane mirror surface coated with a high-reflectivity multi-layer dielectric coating, the topmost dielectric of which is grooved into a grating and coated with a transparent dielectric having a refractive index very similar, but not the same, as the grooved layer to form a weak phase grating for diffracting a weak first order sampling beam.

6 Claims, 4 Drawing Figures

VERY LOW ABSORPTION, LOW EFFICIENCY LASER BEAMSAMPLER

BRIEF SUMMARY OF THE INVENTION

This invention relates to laser beamsampling and particularly to a new and improved very low absorption phase grating for specularly reflecting substantially all of an incident beam while producing a very weak first order diffracted beamsample that may be used for intensity and phase profile measurements.

In many laser applications it is necessary to continuously monitor the intensity and phase profile of a laser beam without distorting the beam characteristics. For such measurements a small fraction of the intensity of the beam is sampled by a beamsampler. For low power applications a typical beamsampler may be made of refractive optical elements; however, for high-power applications, such refractive elements are not suitable because their absorption, although small, creates heat in the beamsampler that causes distortion that can alter the phase profile of the beam. In such high-power applications, diffraction gratings have been successfully employed for reflecting the main beam while generating weak first or second order diffracted beams to be measured by the beamsampler.

Typically a well designed beamsampler grating has an absorption coefficient in the order of one to two percent. In high-power laser applications, this absorption may not damage a water-cooled grating; however, the absorption generates some localized heating that has the effect of aberrating both the main laser beam and the sampled beam. For these higher power laser applications, it is therefore necessary to employ a very high reflective and very low absorption beamsampler grating with a relatively law sampling efficiency.

It is well-known that in shallow grooved gratings, the grating efficiency and absorption varies approximately as the square of the groove depth. For example, in a ruled grating having groove depths in the order of 1,000 Angstroms, both the absorption and the efficiency is approximately one percent. For high-power laser beams, this absorption level is excessive and may cause distortion which, as mentioned above, may aberrate both the main laser beam and the sampled beam. For such high-powered application, it may be desired to have an absorption in the range of 0.01%. This cannot be obtained by reducing the depth of the grooves in a shallow ruled grating because grooves having a depth of even 10 Angstroms would be lost, even in a highly polished surface.

To overcome the disadvantages of the very shallow ruled gratings described above, gratings having the shallowest practical depth have been coated with multilayer dielectric high-reflectivity coatings. As is well-known, such coatings on a plane metal mirror can produce very high reflectivly and low absorption, and typically consists of alternate layers of $ThF_4$ and $ZnSe$ (or $ZnS$) in optical thicknesses of one-quarter of the laser beam wavelength. While such multilayer dielectric high-reflectivity coatings generally have an absorption of less than 0.1% on a plane metal mirror, the dielectric layers applied to a shallow grooved grating will follow the grating profile and will absorb a higher percentage of radiation than the same coating applied to a plane metal mirror surface.

In order to eliminate the problem created by applying the multilayer dielectric coating on a shallow grating as described above, some gratings have been designed in which the grating is coated with a dielectric of one-half optical wavelength in thickness, the top surface of which is polished flat. This polished dielectric is then coated with a high reflectivity multilayer dielectric stack which will then follow the flat plane surface of the polished dielectric coating over the grating. This form of grating very greatly reduces the efficiency, often to a range in the order of $10^{-5}$, which is too low for most applications. To improve the efficiency, an echelette type of grating is generally used. While the efficiency of such a grating may thus be controlled, the absorption remains high for the reason that several orders of diffracted beams will be trapped in the burying layer applied over the grating and, in addition, there will be trapping due to fractions of the specular and first order beams reflected back from the top of the burying layer. As previously discussed, this may produce overheating of even a water-cooled grating and consequent distortion of the specular and sampled beams.

The above disadvantages and defects have been eliminated in the present invention which permits beamsampling of very high-power laser beams without aberrating either the main beam or sampled beam.

Briefly described, the beamsampler of the present invention comprises a plane polished metal surface coated with a multilayer high-reflectivity dielectric coating. The outer or top surface of the top layer of the dielectric coating is etched with a conventional shallow ruled grating and is then coated with a "transparent" protective layer of a dielectric material having a half wavelength optical thickness and an index of refraction only slightly different than that of the top layer etched grating dielectric. Since the refractive indices are different, the grating grooves form a weak phase grating due to the periodic refractive index variation. However, since the refractive indices are comparable, there is an approximate index matching so that the absorption is comparable to that of an ideal enhanced reflector. The weak phase grating produced by the grating dielectric and its protective layer produce a very low sampling efficiency diffracted beam that may be utilized for measurement by a subsequent wave front analyzer.

DESCRIPTION OF THE DRAWINGS

In the drawings which illustrate the preferred embodiment of the invention.

DETAILED DESCRIPTION

Figure 1:
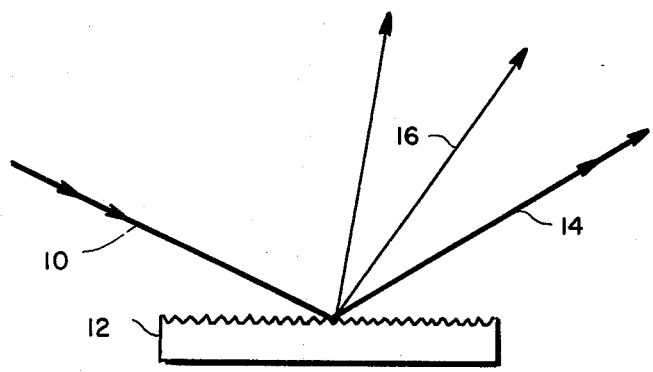
FIG. 1 is an elevation view illustrating the principle of a grating beamsampler.

FIG. 1 is an elevation view illustrating the purpose and function of a beamsampler. In the beamsampler of FIG. 1, a monochromatic beam 10 such as produced by a laser is directed to the beamsampler 12 which includes a diffraction grating designed to specularly reflect substantially all of the incident beam 10 into a reflected beam 14 while producing a first order diffracted beam 16 which may be directed to measuring devices such as, for example, a laser wavefront analyzer. If the incident beam 10 is not monochromatic, the diffracted sample beam 16 may be directed to the surface of a complementary grating (not shown) which recollimates its incident dispersion into a grating rhomb, as discussed in U.S. Pat. No. 3,861,801, issued Jan. 31, 1975 to Peters et al and assigned to The Perkin-Elmer Corporation.

The sampling efficiency of a beamsampler grating such as the grating 12 will depend upon the required intensity of the first order diffracted beam and, of course, the sensitivity of the subsequent measuring devices. In most instances, a sampling efficiency of 0.1% is practical and readily obtained by a well designed grating 12. For very high-power incident radiation, however, this sampling efficiency will be excessively high and, in some instances, the intensity of the incident radiation beam 10 combined with the sensitivity of the associated measuring equipment may be such that a sampling efficiency in the order of $3 \times 10^{-4}$ may be desired, thereby enabling substantially all of the incident radiation to be specularly reflected.

An ideal grating beamsampler will reflect and diffract all the incident radiation without any absorption. This, of course, is quite impossible and a typical well designed metal grating will generally have an absorption coefficient in the order of 1% to 2%. This level of absorption will not damage the grating nor affect the specularly reflected beam 14 from relatively low power lasers. However, at higher power levels, this absorption will cause distortion of even water-cooled gratings and this distortion will aberrate both the reflected laser beam 14 and the sample beam 16.

In the design of grating beamsamplers for high-power laser operation, it is accordingly necessary that the grating have a minimum absorption coefficient, for example, 0.2% or less, and a relatively low sampling efficiency of, for example, $3 \times 10^{-4}$. In relatively high-power laser applications, this sampling efficiency is adequate to provide a first order diffracted beam of adequate intensity for subsequent measurement, and the minimal absorption needed to prevent overheating of the grating and a consequent aberration of the zero and first order beams emanating therefrom.

Figure 2:
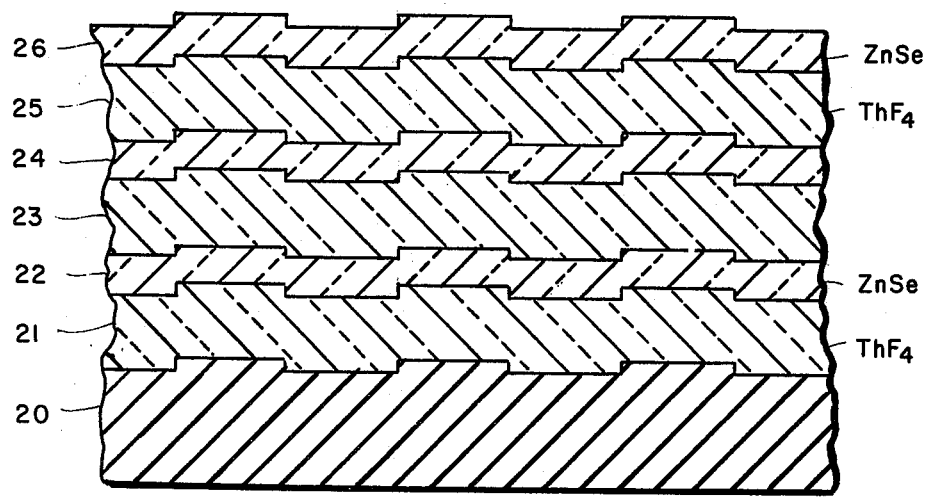
FIG. 2 is a sectional elevation view of a prior art grooved grating beamsampler.

FIG. 2 is a cross-section elevation view of a typical existing beamsplitter and comprises a shallow diffraction grating 20 of a highly-reflective metal, such as gold, covered with a well-known high-reflectivity multilayer dielectric coating. It is well-known that such dielectric coatings on a plane metal mirror can produce very high reflectivity and low absorption in the order of 0.1% or less. Typical materials for use in the well-known dielectric coatings are Thorium Fluoride ($ThF_4$) and Zinc Selenide or Zinc Sulfide (ZnSe or ZnS, respectively), alternately deposited in layers of one-quarter wave optical thickness (actual thickness times the index of refraction). An analysis of this shallow grating with the multilayer dielectric coating is presented in an article by J. M. Elson in *Applied Optics*, Volume 16, Page 2872 (1977) and the grating with its enhanced reflective coating does, in fact, reflect the main beam and produce at least first order refracted sample beams. However, as illustrated in FIG. 2, the surfaces of the dielectric layers 21 through 26 follow the profile of the grating 20 and, because of this, it can be shown that the absorption of the beamsampler is considerably higher than that of an enhanced reflector comprised of a plain mirror coated with a dielectric stack.

Figure 3:
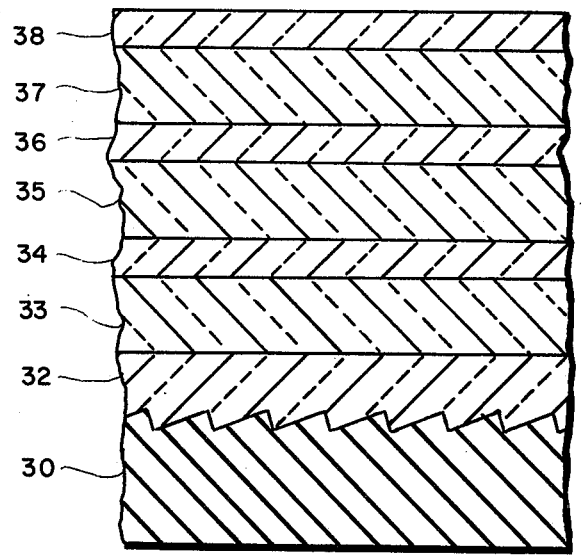
FIG. 3 is a sectional elevation view of another prior art beamsampler employing a buried echelette grating.

FIG. 3 is a cross-section elevation view of another prior art embodiment of a beamsampler that has been designed to eliminate the grating profiles in the dielectric layers as discussed in connection with FIG. 2. In FIG. 3, an echelette grating 30 in the surface of a reflective metal such as gold, is coated with a layer 32 of a dielectric material such as Zinc Selenide. The top surface of this layer 32 is then polished and coated with half-wave optical thicknesses of dielectric pairs, such as Thorium Fluoride and Zinc Selenide 34-38, to enhance the reflectivity of the buried grating 30. The purpose of the echelette type of grating 10 is to increase the efficiency of the beamsampler. If a normal shallow grating such as grating 20 of FIG. 2 is buried in a dielectric such as the dielectric 32, which is then polished and coated with a dielectric stack 33-38, the sampling efficiency which may be 1% in the embodiment of FIG. 2 will be reduced to a very low level in the order of $10^{-5}$. Since this is excessively low for most applications, a higher efficiency grating such as the echelette type grating 30 must be used. Unfortunately, the buried grating configuration has been found to have relatively high absorption, in the order of 0.5% which is adequate for low power operation but would cause overheating of the beamsampler and consequent distortion of the reflected and diffracted beams in high-power applications.

Figure 4:
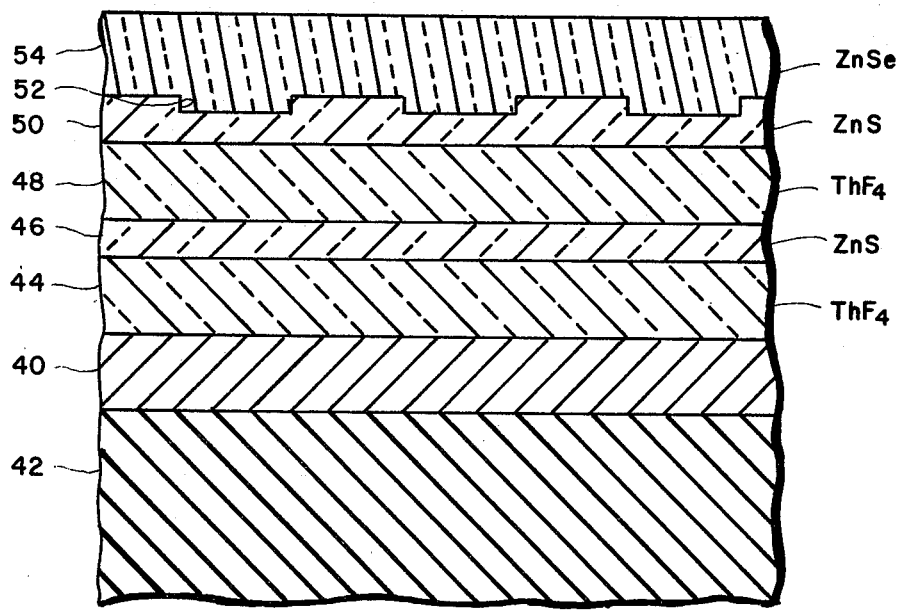
FIG. 4 is a sectional elevation view of the phase grating beamsampler of the invention.

FIG. 4 is a cross-section elevation view illustrating the phase grating beamsampler in which both efficiency and absorption coefficients may be varied and held at a very low level for distortionless high-power laser beam sampling. In the embodiment of FIG. 4, a plane reflective layer 40 of a metal such as gold is applied over a suitable metallic substrate 42. The surface of the layer 40 that is opposite the substrate layer 42, or the top surface of layer 40, is coated with a plurality of layers, 44, 46, 48 and 50, of dielectric material, applied in quarter wave optical thicknesses. Typically, the layers 44 and 48 are Thorium Fluoride with a relatively low index of refraction of approximately 1.5 and the layers 46 and 50 are Zinc Sulfide having a relatively high index of refraction of approximately 2.5. The top surface of the top Zinc Sulfide layer 50 is grooved by ion etching or the like with a shallow grating 52 having groove depths in the order of 500 Angstroms, and the grooved top surface is thereafter coated with a protective layer 54 of Zinc Selenide with an index of refraction of approximately 2.4 at the laser wavelength. The Zinc Selenide layer 54 is applied to a thickness of one-half optical wavelength and is therefore transparent at that wavelength. Since the refractive indices of the Zinc Selenide layer 54 and the Zinc Sulfide layer 50 are different, the grating grooves at their interface form a weak phase grating due to the periodic refractive index variation. However, since the refractive indices are comparable, there is an approximate index matching so that the absorption of the beamsampler is extremely low and is comparable with that of an ideal enhanced reflector.

Absorption of the beamsampler of FIG. 4 may be varied somewhat by the number of dielectric pairs between the top surface of the reflective layer 40 and the grating layer 50. If more dielectric pairs, such as the pair including layers 44 and 46, are applied over the reflective layer 40, the percentage of absorption is reduced; however, the change in percentage decreases with the addition of each additional dielectric pair. For example, it can be shown that when three dielectric pairs of Thorium Fluoride and Zinc Sulfide are applied between the plane mirror layer 40 and the grating layer 50, the beamsampler absorption is approximately 0.23%; four dielectric pairs decrease the absorption to approximately 0.14%; five dielectric pairs reduce it to 0.10%; six pairs produce 0.09%, etc.

Sampling efficiency of the beamsampler is substantially independent of the number of dielectric pairs located between the reflective layer 40 and the grating layer 50 and may be, for example, approximately $3 \times 10^{-4}$ for grating grooves 52 having a depth of approximately 500 Angstroms. Efficiency may be varied, however, by varying the depth of the grating grooves 50 since the efficiency varies approximately as the square of the groove depth, lowering with shallower grooves and vice-versa. Efficiency can also be varied by adding dielectric pairs on top of the Zinc Selenide layer 54 or by locating the grating layer 50 at a lower level on the dielectric stack. For example, a typical efficiency of $3 \times 10^{-4}$ for the beamsampler illustrated in FIG. 4 will be reduced to an efficiency of approximately $0.6 \times 10^{-4}$ if an additional dielectric pair is applied to the top of layer 54 or if the dielectric pair 50 and 54 is inserted between layers 44 and 46. The second dielectric pair over the layer 54 would further reduce the efficiency to approximately $0.15 \times 10^{-4}$.

In the preferred embodiment described above, typical dielectric material, such as Thorium Fluoride and Zinc Sulfide have been described as comprising the dielectric layers applied in quarter-wave optical thicknesses. These dielectrics are well-known for use as reflective coatings and it is also apparent that other materials employed in such coatings may be used herein. In order to obtain a weak phase grating in the beamsampler, the top dielectric material, described herein as a Zinc Sulfide layer 50, must be grooved and coated with a transparent half-wave optical thickness of a dielectric having an index of refraction very similar to, but different than, that of the dielectric in the grooved grating layer 50. In the embodiment described, the grooved layer 50 is Zinc Sulfide having an index of refraction of approximately 2.52 at a laser wavelength of 3.9 microns, and the overlying Zinc Selenide layer 54 has an index of refraction of approximately 2.44 at that wavelength. It is apparent that similar results are obtained if Zinc Selenide is used as the grooved layer 50 and is coated with a half-wavelength thickness of Zinc Sulfide as the protective layer 54. It is also apparent that other dielectric combinations may be employed for the grating layer 50 and overlying layer 54 as long as the diffraction indices are similarly different.

Having thus described my invention, what is claimed is:

1. A very low absorption, low efficiency, laser beamsampler comprising:
   a plane reflective surface;
   a plurality of dielectric pairs overlying said reflective surface, each of said pairs comprised of a first layer of dielectric material having a high refractive index and a second layer of dielectric material having a low refractive index, said first and second layers being deposited in one-quarter wavelength optical thicknesses;
   a shallow groove diffraction grating formed in the top surface of the top layer of the top dielectric pair; and
   a protective layer of a third dielectric material applied over said diffraction grating, said third material applied to an optical thickness of substantially one-half wavelength, said third material having an index of refraction similar to, but different than, that of the dielectric material of said top layer of said top dielectric pair.

2. The beamsampler claimed in claim 1 wherein the dielectric material in said first layer is Zinc Sulfide.

3. The beamsampler claimed in claim 1 wherein the dielectric material in said first layer is Zinc Selenide.

4. The beamsampler claimed in claims 1, 2 or 3 wherein the dielectric material in said second layer is Thorium Fluoride.

5. The beamsampler claimed in claim 2 wherein said grating is formed in the top surface of a top layer of Zinc Sulfide, and said third dielectric material is Zinc Selenide.

6. The beamsampler claimed in claim 3 wherein said grating is formed in the top surface of the top layer of Zinc Selenide and said third dielectric material is Zinc Sulfide.

* * * * *